Dec. 15, 1953     L. O. FRENCH     2,662,510

COMPRESSION IGNITION INTERNAL-COMBUSTION ENGINE

Filed Dec. 18, 1950

INVENTOR.
Louis O. French

Patented Dec. 15, 1953

2,662,510

UNITED STATES PATENT OFFICE 2,662,510

COMPRESSION IGNITION INTERNAL-COMBUSTION ENGINE

Louis O. French, Milwaukee, Wis.

Application December 18, 1950, Serial No. 201,362

3 Claims. (Cl. 123—32)

1

The invention relates to compression ignition internal combustion engines and more particularly to an open type combustion chamber.

The invention is for an improvement on that form of open type combustion chamber in which the chamber is, except for a working clearance, formed by an open cavity wholly within the piston into which fuel is injected near the end of the compression stroke. Chambers of this type also act in conjunction with an induction induced swirl, either by the use of a masked inlet valve or its equivalent in a four cycle engine or tangentially disposed inlet ports in a two cycle engine which swirl is augmented by the active squish action of the air produced by the small clearances between the annular top portion of the piston surrounding said chamber and the cylinder head. Combustion chambers as described above and generally known as toroidal chambers have been quite widely used, especially in England, in motor vehicle engines but have certain recognized drawbacks. Such open type chambers have a longer ignition delay period than the so-called swirl type chamber using compression pressure induced swirl, they are more critical of the quality of fuel used as compared to the swirl chamber and precombustion chamber types, and they require the use of high injection pressures usually through multi-orifice nozzles. The object of the present invention is to provide certain modifications in the structure of the open type chamber above described by which the ignition delay period will be reduced, and a wider choice of fuels and less sensitive fuel injection equipment may be used.

A further object of the invention is to provide a combustion chamber of the type above described in which in place of the usual centrally disposed integral projection at the bottom of the chamber, a hot surface ignition tube or supplemental chamber is used and preferably one that acts as a burner for that portion of the fuel charge forced into it during the compression stroke, the action of this tube aiding in the heating of the injected fuel and the mixing of the fuel with the air.

The invention further consists in the several features hereinafter set forth and more particularly defined by claims at the conclusion hereof.

In the drawings:

Fig. 1 is a vertical sectional view through an internal combustion engine equipped with a combustion chamber embodying the invention;

2

Figure 1:
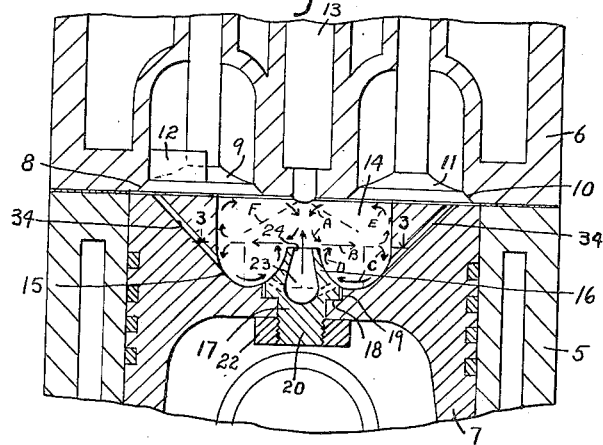

Referring to the drawings, the numeral 5 designates the cylinder of the engine, 6 the cylinder head, and 7 the piston mounted as usual for reciprocation in the cylinder. As shown in Fig. 1, the head is provided with an air inlet port 8 controlled by an inlet valve 9 and an exhaust port 10 controlled by an exhaust valve 11. For producing an induction induced swirl, the inlet valve 9 is provided with a mask 12 which functions in known manner to impart a swirling motion to the air passing into the cylinder. The mask is illustrative of one form of means for inducing swirl in a four cycle engine. In a two-cycle engine, the scavenge air inlet ports are tangentially inclined relative to the cylinder bore for this purpose. A fuel injector 13 of any suitable form is mounted in the cylinder head and may be provided with either a multiple hole nozzle or a pintle type nozzle.

A toroidal cavity or chamber 14 is formed wholly within the piston. The diameter of this chamber is usually one-half or slightly more than one-half of the diameter of the piston, and its depth is usually approximately one-half its diameter. For best results the diameter of this chamber is such that the top of the piston surrounding the chamber is an annulus of considerable area, so that when the piston reaches the end of its compression stroke, a pronounced squish effect on the air confined between the piston, cylinder and head is produced, the piston having only a working clearance with the head, for example, .03″ to .06″.

As shown in Fig. 1, the chamber 14 is of uniform diameter for more than one-half its depth and has rounded inner ends 15 which merge into a conically formed central projection 16. According to the present invention, the projection 16 is formed as a part of a plug 17 provided with a shoulder 18 abutting the bottom of a counterbore 19 in the piston and having a shank 20 extending through a bore 21 concentric with the bore 19. The shank 20 is threaded to receive a nut 22 which engages the bottom of the head of the piston 7 and clamps the shoulder 18 fluidtight against the bottom of the bore 19. For heat insulating purposes the sides of the plug adjacent the bore 19 do not contact the same.

Figure 3:
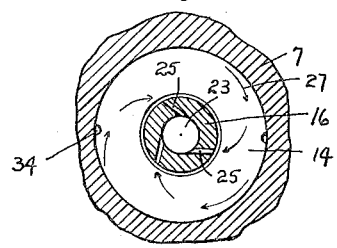
Fig. 3 is a detailed horizontal sectional view taken on the broken line 3—3 of Fig. 1.

The plug 17 is of suitable high heat resisting material such as a nickel-chromium alloy such as "Nichrome," or a cobalt, nickel, chromium steel alloy such as "Stellite," or any other suitable metal alloy. The plug 17 has a tubular centrally disposed cavity 23 formed therein extending upwardly through the projection 16 with an outlet 24 opening into the central portion of the chamber 14 and one or more inlets 25 connecting its closed end 26 with the bottom of the chamber 14. The walls of the cavity 23 may be conically inclined from the smaller outlet 24 to its larger closed end to aid in increasing the velocity of fluid flow from its outer end. The area of the outlet 24 is preferably at least equal to the combined area of the inlets 25. The inlets 25 are preferably disposed tangentially of the inner wall of the tube and in the same direction as the spiral swirl of gases in the chamber indicated by the arrows 27 in Fig. 3.

Figure 2:
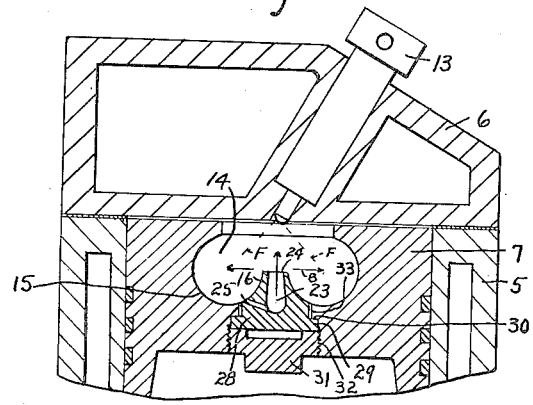
Fig. 2 is a view similar to Fig. 1 showing certain modifications.

In the form shown in Fig. 2 the fuel injector 13 is disposed at an angle between valves (not shown) and the chamber 14 is a torus. The conical projection 16 with its tubular cavity 23 having its outlet 24 discharging into the central portion of the chamber 14 and its inlet or inlets 25 disposed in line with the general direction of flow of gases in said chamber is formed as a part of a plug 28 of high heat resisting material having an annular base flange 29 abutting the annular shoulder 30 formed in the head of the piston and clamped thereagainst in sealed relation by a plug 31 in threaded engagement with the bore 32 in said piston. The upper part of the plug 28 where it passes through the bore 33 in the piston may be spaced therefrom for heat insulating purposes. The top of the piston has only a working clearance with the cylinder head though in some instances shallow valve clearance recesses may be formed in the piston top.

In compression pressure ignition engines having combustion chambers of the general forms shown in Figs. 1 and 2 but with solid bottom portions and utilizing a pronounced squish action and induction induced swirl, it has been found that during the last part of the compression stroke, the gases in the central portion of the open chamber have a purely rotational movement in a substantially horizontal plane, that above this portion the gases move spirally upwards toward the open end of the chamber and on reaching the opening travel in the same direction rotationally as the spiral flow over the piston crown. Beneath the central portion above referred to the gases move spirally downwards toward the bottom of the chamber and pass across the bottom to the center of the chamber in a spiral following the same direction as that of the spiral gas flow over the crown. This action is true whether the open chamber is of the form shown in Fig. 1 or in Fig. 2.

This invention makes use of the gas movement phenomena above described by forming the central portion of the chamber as a tube up which some of the gases may pass to the central portion of the chamber where they mix with the gases rotating in a substantially horizontal plane and then pass with these gases spirally toward the bottom and the top of the chamber. Since the tube or projection 16 is red hot or operating at a high temperature when fuel is introduced in the chamber 14 near the end of the compression stroke, the gases entering the cavity 23 will be mixed with a portion of the fuel charge which fuel carrying gases will burn readily either in the cavity or as they leave the outlet 24 and mix with the other gases and raise their temperature more quickly to the ignition point and thus reduce the ignition delay period, the tubular cavity 23 acting as a continuous flow burner. Since the cross-sectional area of the cavity 23 is small, its heat is readily imparted to the fuel carrying stream passing through it and also other gases contacting the outer hot walls of the projection 16 are heated thereby to an ignition temperature. The hot surface projection 16 also insures that a definite ignition point of the charge is located at the central portion of the chamber from which flaming gases are propagated into the streams of fuel laden gases passing upwardly and downwardly from the central zone of said chamber. These flaming gases help to break up the incoming fuel so that high injection pressures through small holes need not be necessary and pintle type or other coarser nozzles may be used. Also because of the greater heat available with the tube, fuels with lower ignition quality than those usually employed in engines of this type may be used.

Referring to Fig. 1, the general operation of the engine is, as follows: During the downward movement of the piston 7 on its induction stroke, the inlet valve 9 is opened and air is admitted into the cylinder 5 in a stream directed to produce a swirl as by the use of the mask 12. On the upward stroke of the piston, this air is compressed, and as the piston nears the end of its compression stroke, the air between the annulus on the top of the piston and the head is squeezed out and forced into the chamber 14 in a spiral path of the same hand as the induced swirl and travels down to the central portion of the chamber where its movement is substantially truly rotary in a horizontal plane and some of the air then spirals down to the bottom of the chamber in the same direction as the initial swirl and moves inwardly over the bottom to the center of the chamber and then upwardly through the axis of the chamber to the central portion of the chamber while some of the air spirals upwardly from said central portion. As viewed in vertical cross section, the action of the air movement is indicated by the arrows A, B, C, D, and E. Near the end of the compression stroke, for example, ten degrees before top dead center, fuel is sprayed into the chamber 14 as indicated by the dotted lines F. Some of the fuel that is carried down with the air into the lower part of the chamber passes through the port or ports 25 into the cavity 23 and moves upwardly to its outlet where as a flaming stream it meets the streams of fuel laden gases A and D, and ignition is rapidly propagated through the charge. This action keeps up as the piston starts on its working stroke on which, after the termination of injection, the gases expand in the cylinder. The expanded gases are forced out of the cylinder on the following stroke past the open exhaust valve 11.

A plurality of equally circumferentially spaced passages 34, for example, four or more, may be provided in the piston as shown in Fig. 1, which passages are preferably tangentially disposed relative to the curved bottom portion of the chamber 14 and open up into the annular top of said piston. Under the squish action previously referred to these passages permit some of the air being forced from the annulus area into the bottom portion of the chamber to assist upward swirl of the area from said bottom and also permit fuel laden air to reach the space between the flat annulus of the piston and the cylinder to secure better distribution of the fuel.

While the above construction is preferred, some advantages might be obtained if the inlets 25 were omitted and part of the fuel introduced into the tube 23 from its open end, and I, therefore, desire it to be understood that this invention is not to be limited to the specific details of construction except as such limitations appear in the appended claims.

What I claim as my invention is:

1. In a compression ignition internal combustion engine of the type having its combustion chamber formed as an open toroidal chamber substantially wholly within the top of the piston into which fuel is injected near the end of the compression stroke, the air supplied to the engine cylinder having rotary swirl imparted to it and the chamber being spaced from the sides of the cylinder to provide a pronounced squish action to augment the rotary swirl as the piston during compression closely approaches the cylinder head, said chamber having a midportion measured vertically of the height of said chamber, the air in said chamber during compression having a substantially rotary movement about said midportion of said chamber substantially coinciding with a horizontal plane half way between the top surface of the piston and the bottom of the combustion chamber and rotary spiral movements in planes at substantially right angles to said horizontal plane, from said midportion toward the top and bottom portion of said chamber, that improvement which comprises forming the central portion of the bottom of said chamber as a conical hot tube projection extending toward but not beyond the above defined midportion of said chamber and having a lengthwise extending axially alined tubular cavity which discharges into said midportion of the chamber in which the air has a substantially rotary movement.

2. The structure as defined in claim 1, in which the lower end of the tubular cavity has restricted communication with the lower part of the bottom of said chamber.

3. In a compression ignition internal combustion engine of the type having its combustion chamber formed as an open cavity with a curved bottom substantially wholly within the top of the piston into which fuel is injected near the end of the compression stroke, the air supplied to the engine cylinder having an induction induced swirl imparted to it and the chamber being spaced from the sides of the cylinder to pronounced squish action to augment the induction induced swirl as the piston during compression closely approaches the cylinder head, said chamber having a midportion measured vertically of the height of said chamber, the air in said chamber during compression having a substantially rotary movement in said midportion of said chamber substantially coinciding with a horizontal plane half way between the top surface of the piston and the bottom of the combustion chamber, and a spiral movement from said midportion towards the top and bottom of said chamber, that improvement which comprises a hot surface projection extending upwardly from the central portion of the bottom of said chamber and provided with a tubular lengthwise extending cavity which opens into said midportion of said chamber, and passages circumferentially spaced about the top of said piston and extending to the bottom of said chamber and tangentially disposed relative to the curved bottom of said chamber.

LOUIS O. FRENCH.

References Cited in the file of this patent

UNITED STATES PATENTS

| Number | Name | Date |
|---|---|---|
| 1,865,841 | Cummins | July 5, 1932 |
| 1,967,243 | Hesselman | July 24, 1934 |
| 2,071,062 | Cummins | Feb. 16, 1937 |
| 2,118,319 | Maynard | May 24, 1938 |
| 2,206,322 | Huesby | July 2, 1940 |
| 2,256,776 | Kammer | Sept. 23, 1941 |
| 2,505,999 | Smith | May 2, 1950 |

FOREIGN PATENTS

| Number | Country | Date |
|---|---|---|
| 676,997 | Germany | June 16, 1939 |